United States Patent [19]

Bergelin et al.

[11] Patent Number: 5,473,896
[45] Date of Patent: Dec. 12, 1995

[54] PISTON WITH CENTRAL VALVE FOR HYDRAULIC BRAKE SYSTEMS

[75] Inventors: Klaus Bergelin, Niedernhausen; Hans-Jürgen Walther, Hemsbach; Harald König, Ober-Mörlen; Rudolf Ludwig, Neu-Isenburg; Kurt Saalbach, Mörfelden-Walldorf; Thomas Kramer, Mörlenbach, all of Germany

[73] Assignee: ITT Automotive Europe GmbH, Germany

[21] Appl. No.: 178,273

[22] PCT Filed: Apr. 16, 1993

[86] PCT No.: PCT/EP93/00924

§ 371 Date: Jan. 7, 1994

§ 102(e) Date: Jan. 7, 1994

[87] PCT Pub. No.: WO93/22170

PCT Pub. Date: Nov. 11, 1993

[30] Foreign Application Priority Data

May 7, 1992 [DE] Germany ............... 42 15 079.5
Jul. 23, 1992 [DE] Germany ............... 42 24 328.9

[51] Int. Cl.⁶ .................... F15B 7/08; B60T 11/28
[52] U.S. Cl. .................... 60/589; 60/591; 91/422
[58] Field of Search .................... 60/547.2, 558, 60/561, 589, 591, 592; 91/422, 376 R

[56] References Cited

U.S. PATENT DOCUMENTS

| 4,237,770 | 12/1980 | Harrison et al. | |
| 4,706,459 | 11/1987 | Burckhardt | 60/589 X |
| 4,918,922 | 4/1990 | Nakano et al. | 60/589 |
| 5,179,834 | 1/1993 | Rauschenbach | 60/589 X |
| 5,214,917 | 6/1993 | Crumb et al. | 60/589 X |

FOREIGN PATENT DOCUMENTS

| 2913265 | 10/1980 | Germany . | |
| 2753949 | 5/1988 | Germany . | |
| 3810447 | 11/1989 | Germany . | |
| 3932248 | 4/1990 | Germany | 60/589 |
| WO9206875 | 4/1992 | WIPO . | |

Primary Examiner—Edward K. Look
Assistant Examiner—John Ryznic
Attorney, Agent, or Firm—Dykema Gossett

[57] ABSTRACT

The present invention relates to a piston with a central valve, in particular for hydraulic boosters, the valve case (6) which is composed of a supporting insert (8) radially embraced by a valve seat (7). It is disadvantageous in some valve cases that sometimes the positive coupling between the two elements in axial direction is not sufficient. The present invention provides a remedy to this problem by using undercuts behind which the valve seat engages the supporting insert in both directions. In an advantageous improvement, the valve insert is of symmetrical design, and a sealing projection is shaped at the valve seat. The guidance of the valve tappet (19) is performed within the piston (1).

20 Claims, 2 Drawing Sheets

PISTON WITH CENTRAL VALVE FOR HYDRAULIC BRAKE SYSTEMS

BACKGROUND OF THE INVENTION

The present invention generally relates to a piston for hydraulic vehicle brake systems. Pistons for such brake systems are known, for example, from DE-OS 39 32 248.

It is considered disadvantageous in conventional central valves that special care must be taken when mounting the valve case; the combination of the valve seat and supporting insert. If the valve pin is not particularly reliably coupled to the supporting insert, e.g. by vulcanization or cementing, the valve seat may become detached from the supporting insert due to the lateral friction at the receiving bore in the piston when the entire valve case is fitted. This is because only the forces which result from the frictional engagement or the adherence effect of the adhesive, respectively, can counteract an axial displacement of the two inserts.

Therefore, the present invention provides a piston for hydraulic vehicle brake systems and its object is to further simplify this piston by affording, in particular, greater ease of manufacture and assembly.

SUMMARY OF THE INVENTION

This object is achieved by providing a piston having two end surfaces on an annular collar enclosed by a valve seat within the piston. Hence, in principle, the present invention resides in providing the combination of a valve seat and supporting insert with axially defined undercuts adapted to receive, without difficulties, the axial forces which develop during the assembly and also during the operation so that the valve seat cannot move axially relative to the supporting insert.

In the prior-known valve case according to DE-OS 39 32 248 the supporting insert extends with an annular end into a stepped bore of the piston. Therefore, in order to be able to fit the valve case, spiral-shaped venting grooves are necessary, and a double centering results relative to the valve case which is usually undesirable. Further, the exact manufacturing tolerances necessary for this purpose are difficult to achieve.

Further, special attention must be paid, in the case of automated assembly, that the valve case is not fitted in an axially wrong position. This invention affords further simplifications by providing the combination of a collar having end surfaces enclosed by the valve seat with the valve case symmetrically disposed about a median plane of the collar which extends transversely to an axis through a central duct. In other words, this implies that one manages without the annular projection at the supporting insert and, hence, without a continuous guidance of the valve tappet within this supporting insert. Therefore, the valve case can be mounted in both axial positions. In addition, the sealing effect of the valve case relative to the piston bore is still augmented, because the two-sided sealing surface and the end surface of the valve case contribute to the sealing relative to the piston bore at the bottom of this bore. Further, the valve case is easier to manufacture because of the measure mentioned above, since the position of the supporting insert during the coupling with the valve seat is unimportant.

The valve member in the known central valve according to DE-OS 39 32 248 is provided with an annular projection in order to enhance the sealing effect. It may be disadvantageous in such an arrangement that the sealing seat of the valve seat will possibly be damaged by the rigid edges of the valve member. It is considered another disadvantage that the annular projection must be manufactured very accurately such that finishing usually is necessary. Admittedly, this could be remedied by particularly precise casting processes, such as aluminum die casting, but manufacturing costs are high for such processes. As a remedy, the present invention provides an annular projection on the valve seat disposed toward the valve member. An augmented sealing effect is achieved by casting an annular projection on the valve seat. This measure permits constructing the valve member in a simple fashion as a drop-forged steel element and removes the need for a casting process.

When the valve case is of symmetrical design, it is advisable to apply an annular receptacle on the bottom of a stepped bore that accomodates the valve case for receiving the annular projection in one embodiment of this invention. The annular accommodating recess provides an improved accuracy of the valve case size relative to the piston because each of the two end surfaces of the valve seat is provided with an annular projection. Further, possible axial forces which might emanate from the annular projection pressed in on the bottom of the bore are kept away from the valve case.

When casting on the valve seat at the supporting insert, the latter has to be fixed in a mold beforehand. It is preferable to provide an axial bore of the supporting insert with annular recesses at its ends in order to avoid damaging the axial bore of the supporting insert.

In order to obtain the inventive undercut between the valve seat and supporting insert, a large number of shapings of the supporting insert are possible. The combination including a rectangular cross-section on the annular collar provides a particularly simple and reliably acting shaping. A supporting insert of such shape can be obtained particularly easily by a casting process or a pressing process.

Another embodiment having the supporting insert achieves augmented strength, especially in an axial direction by including a conical taper on the supporting insert.

It has already been explained hereinabove that the known valve case according to DE-OS 39 32 248 principally necessitates double centering. On the other hand, this valve case is desired to be used at the same time for the true-to-size guidance of the valve tappet. When applying this principle to a valve seat in hydraulic brake systems, the tappet would have to extend through two bores which align with each other. Such alignment might entail undesirable difficulties which are eliminated in an improvement provided by the present invention. Namely, the diameter of the axial bore of the valve case is larger than the diameter of the subsequent axial bore of the central duct in the piston. Hence, the valve tappet is guided only in the axial bore of the piston so that the walls of the axial duct simultaneously serve as guiding surfaces.

As a material combination, it has proven expedient to use aluminum for the supporting insert and for the piston itself. The structure of the individual component parts in relation to each other has been chosen such that no adverse effects result from the valve member being made of a different material; preferably steel. As an auxiliary measure, it may be advisable to insulate the surfaces of different metals which slide on each other by coating them, which can be effected for instance by nickel-plating, by zinc-plating, or similar coating methods.

Pistons according to the present invention are required in master brake cylinders with a central valve for anti-lock hydraulic brake systems (ABS). There is the difficulty in these brake systems that the central valve has to be opened under pressure. From this ensues the risk that the valve seat, which is composed of a relatively soft elastic material, is damaged by the flow forces developing at the opening valve. The problems existing in this respect have been described in detail in DE-OS 40 40 271. Further, a solution has been indicated in DE-OS 40 32 873 arranging for two valves to be connected in series. Another suggestion (see, for example, P 42 23 353) made in this respect is directed to replacing the function of the second valve, which protects the central valve, by a simple restrictor or a restrictor controllable by differential pressure.

Another object of the present invention is to improve upon the design of the central valve including the associated protection devices described hereinabove regarding the reliability and the speed of the mode of operation of the central valve and to better protect the central valve on opening against the high pressure in the working chamber. To this end, the central valve according to the species can be furnished with the initially described features respectively or in combination.

In this embodiment, this object is achieved by the combination of a protection device connected upstream of the central valve in the direction from a working chamber at the open piston end to the central duct. That is to say, in principle, the present invention provides a controlling protection device for the central valve according to the embodiment which limits the quantity of pressure fluid which maximally flows through the central valve, in particular when pressure prevails in the working cylinder.

According to favorable improvements provided by the present invention, the controlling protection device can be a stationary restrictor, or a dynamic restrictor. Details in this respect are explained more closely in P 42 23 353. P 42 23 353 is hereby incorporated by reference into this application.

Another advantageous embodiment of this invention includes an upstream connected protection valve like that explained in principle in DE-OS 40 32 873, for example.

Two embodiments of the present invention are described hereinbelow with reference to the accompanying drawings.

DETAILED DESCRIPTION OF THE PREFERRED EMBODIMENTS

Figure 1:
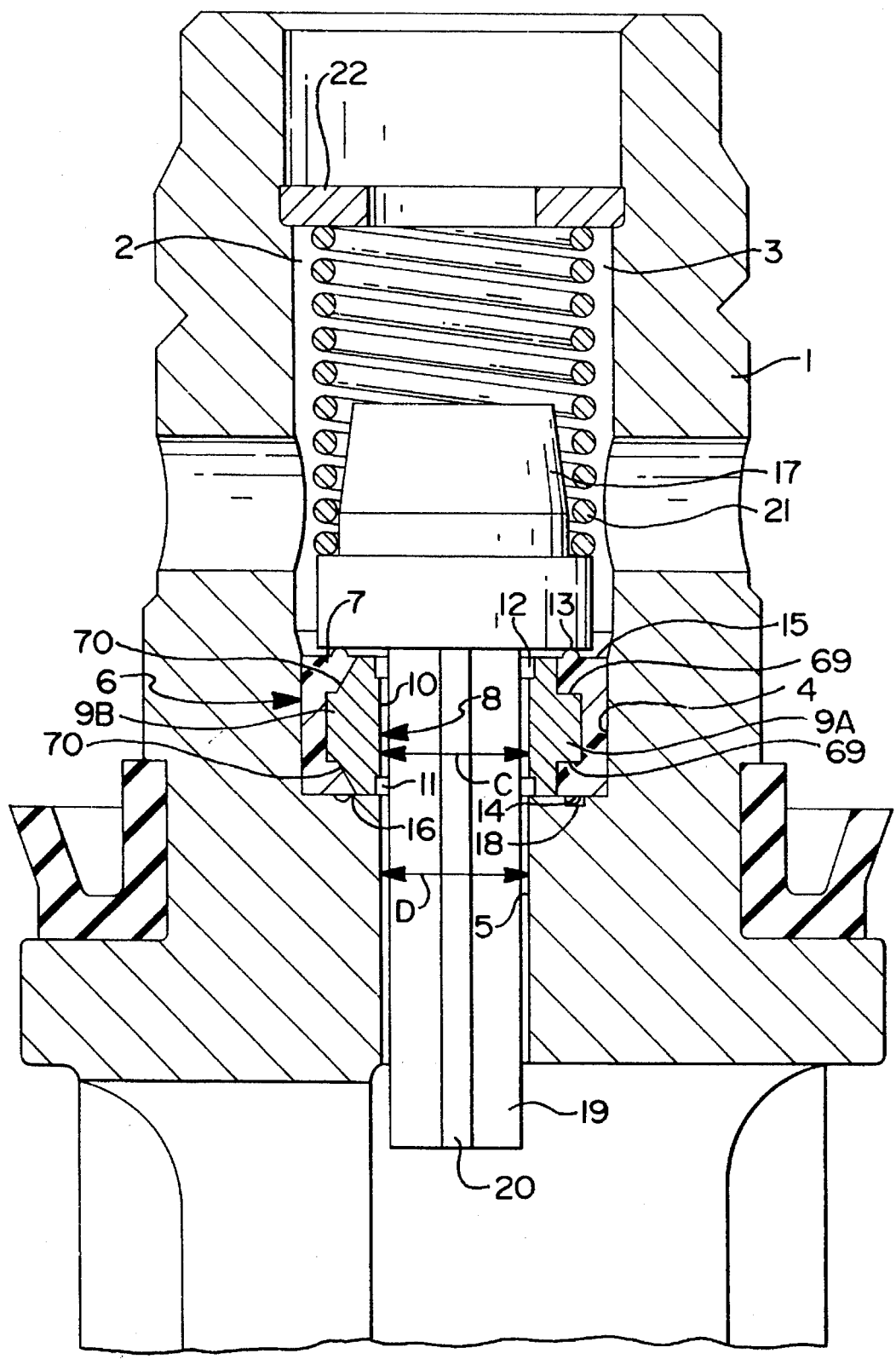
FIG. 1 is a partial sectional view of a piston according to this invention with a central valve.

First, a piston according to the present invention will be described with reference to FIG. 1. DE-OS 39 32 248 discloses individual elements of a master cylinder, in particular a tandem master cylinder, which can utilize the piston of the present invention.

The piston 1 shown in a cross-sectional view, which can be, for example, e.g. the push rod piston or the secondary piston of a tandem master cylinder, is furnished with a stepped bore 2 which consists of a first bore section 3 of large diameter and a stepped second bore section 4 of slightly reduced diameter and a third bore section or central duct 5 of a relatively greatly reduced diameter.

The drawing shows a valve case 6 which includes a valve seat 7 and a supporting insert 8. The valve seat 7 is vulcanized or cast on the supporting insert 8. In order to improve the receiving of axial forces between valve seat 7 and supporting insert 8, the supporting insert 8 is furnished with an annular collar 9A, 9B. The drawing shows two versions of an annular collar which can be used optionally. On the right-hand side of the drawing a collar 9A with rectangular cross-section is shown which is used preferably. Another possibility resides in furnishing the collar 9B, as is depicted on the left-hand side of the drawing, with a substantially conical shape which passes over into a rectangular section. In both versions, the annular collar 9A, 9B is enclosed on both of two end surfaces 69, 70 by the valve seat 7.

The valve insert 6 is preferably symmetrical relative to its median plane that lies transversely to the longitudinal axis of the bore 3 so that it can be mounted in both positions. The diameter C of the axial bore 10 of the supporting insert B is larger than the diameter D of the central duct 5. At both ends of axial bore 10, supporting insert 8 is provided with two annular recesses 11 and 12 which are meant to prevent, in the manufacture of the valve case 6, tapering of the ends of bore 10 during the manufacturing process.

At least at one of its two end surfaces 15, 16, the valve seat 7 carries an annular projection 13 which serves as a means for improving sealing in relation to a valve member 17. On the right-hand side of the drawing, a symmetrical design of the annular projection is illustrated so that the valve seat 7 in this case comprises the annular projections 13 and 14. It is preferable that the piston 1 is provided with a mating annular receptacle 18 on the bottom of the second bore section 4, in order to provide a smooth abutment surface on the bottom of the bore section for the end surface 16. In an alternative embodiment, annular receptacle 18 is eliminated (according to the left-hand side of the drawing). It is advantageous in this latter embodiment that valve seat 7 comprises an annular projection 13 on only one side. In this case, there is not complete symmetry of the valve case 6.

The valve member 17 is furnished with a tappet 19. The diameter of the axial bore 10 is chosen to be larger than the diameter of the central duct 5 such that the tappet 19 is guided on the peripheral surface of the central duct 5. Since the duct 5 serves simultaneously as a pressure-fluid duct, the tappet 19 takes support on the bore walls preferably only by means of three webs 20. The webs 20 extend in the longitudinal direction of the axis of the stepped bore 2 and are evenly distributed on the periphery of the tappet.

The valve member 17 is biased relative to the valve seat 7 by means of a spiral spring 21. Spring 21 bears against the piston by means of a prop ring 22 which is adhered to the piston 1 or is permanently fixed in any other conventional fashion. However, the prop ring 22 can also snap in a corresponding receiving groove in order to simplify the structure of the central valve.

Piston 1 and the supporting insert 8 are preferably made of aluminum, while the valve member 17 is pressed from steel. (e.g. forged or drop-forged).

Figure 2:
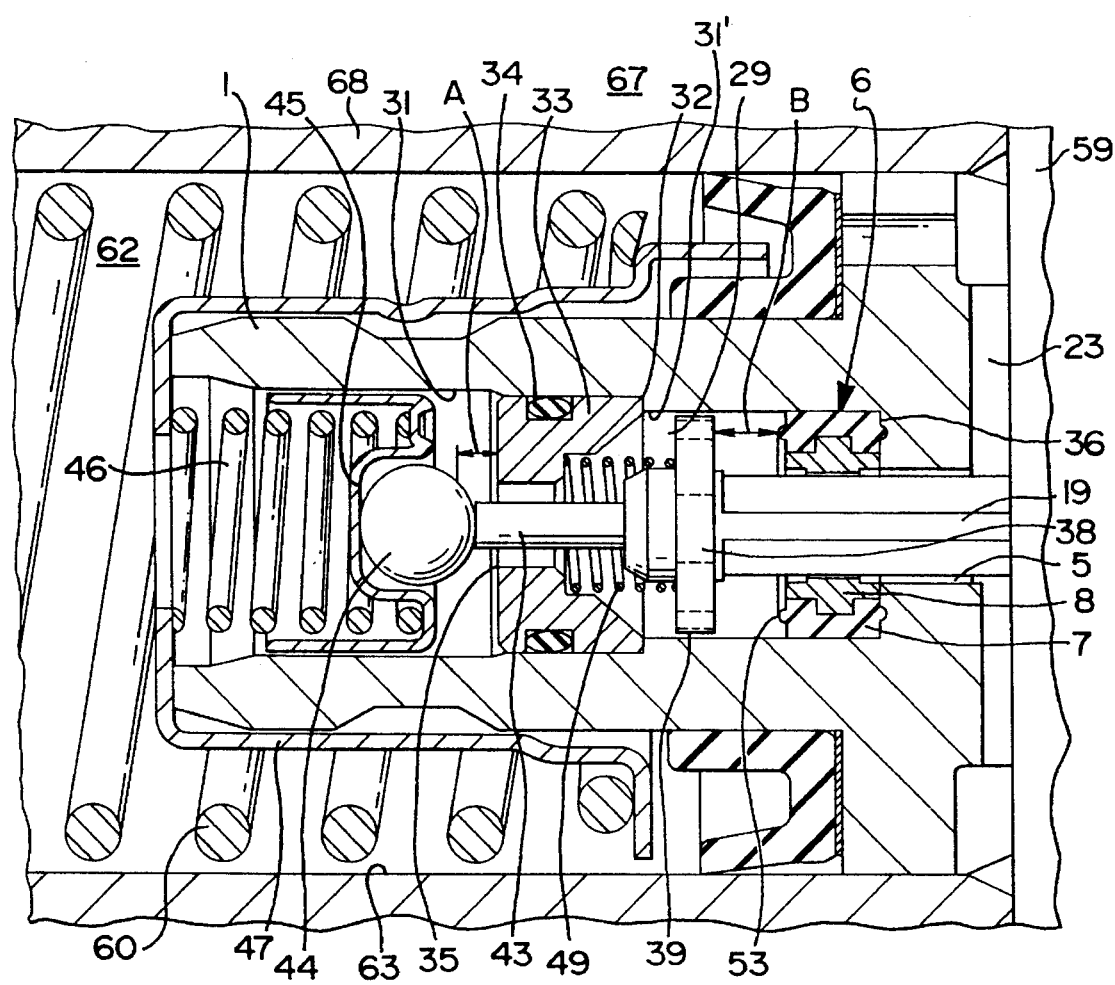
FIG. 2 is a partial sectional view of a piston according to this invention with an additional protection valve.

An embodiment of the present invention with a protection device will be explained in the following with reference to FIG. 2. Regarding the central valve, reference is made to the description of FIG. 1, and regarding the design of the protection valve, reference is made to DE-OS 40 32 873 which is hereby incorporated into this specification by reference.

The master brake cylinder 67 is composed of a housing 68 with a blind-end bore 63 in which a piston 1 is sealingly guided.

A spring 60 is interposed between a non-illustrated secondary piston and the piston 1.

A central valve 6, 38 is arranged in the piston 1. A more precise description of the central valve will follow below.

A tappet 19 extends in the direction of the longitudinal axis of the piston 1 and serves to actuate the central valve 6, 38, as will be explained in the following. The tappet 19 abuts transverse pin 59, which is illustrated in part only, and keeps the central valve 6, 38 open.

The piston 1 confines a working chamber 62 which is connected with the brake circuits and with the outlet of the pump.

The tappet 19 is guided in a narrow longitudinal bore which serves simultaneously for the exchange of pressure fluid between the working chamber 62, and a supply reservoir, respectively. In order that an unhindered pressure fluid balance occurs, a compensating bore 23 can be provided in the piston 1 which extends substantially transversely to the longitudinal axis of the piston. As a substitute, the tappet 19 can be provided with longitudinal grooves.

The piston 1 is provided with a longitudinal bore 31, stepped several times, which extends from the frontal end confining the working chamber 62 up to the compensating bore 23. The largest step of the longitudinal bore is disposed adjacent the frontal end of the working chamber 62. This portion ends at a step 32 on which a cylinder-shaped insert member 33 is supported. The insert member 33 is provided with a seal 34 sealing the insert member at the outside periphery, thereby permitting merely pressure fluid flow through the central duct of the insert member 33. Due to a special outside contour, the insert member 33 can also be pressed sealingly into the bore. The central duct is provided with a tempered valve seat 35 on its end close to the working chamber 62. Beginning at the insert member 33, another portion of the longitudinal bore 31 extends to a second step 36 which has an annular surface. Following the second step 36, finally, is a duct 5 in which the actuating tappet 19 is guided. Also, the compensating bore 23 branches off from the duct 5, allowing the duct 5 to be very narrow, at least in partial areas, so that it may serve as a guidance for the tappet 19.

Arranged in the space between the first step 32 and the second step 36 is a closing member 38 at one end of the tappet 19. The diameter of the closing member 38 corresponds substantially to the diameter of the section of the longitudinal bore 31 that receives closing member 38, thereby providing a guidance. Pressure-fluid flow past the closing member 38 is realized by passages 39 defined near the outer rim of the closing member 38.

As a movable seat, the central valve has the closing member 38 (preferably made of steel) which is inserted between an actuating pin 43 and the tappet 19. This movable closing member 38 cooperates with a valve case 6 which is inserted in the second step 36 of the longitudinal bore 31. The stationary valve case 6 substantially consists of an annular valve seat 7 which is mounted on a supporting insert 8. Further details in this regard are explained in reference to FIG. 1 above. Simultaneously, the supporting insert 8 forms a stop for the movable closing member 38. A bead 53 which extends annularly in the direction of the closing member 38 takes care of the necessary sealing of the central valve 6, 38 in the closed condition. The distance between the bead 53 and the closing surface of the closing member 38 is referred to by B.

The actuating pin 43 projects through the central duct of the insert member 33 and abuts on a valve ball 44 which cooperates with the valve seat 35. The valve ball 44 is held by a guide element 45 on which a spring 46 is supported. On its other side, this spring 46 bears against a bushing 47 which is installed on the piston 1. It must be noted that a spring 49 is supported between the insert member 33 and the closing member 38 which, like the spring 46, ensures the reliable closing of the respective valve.

The connection between the valve closing member 38 and the actuating pin 43 is adapted such that, in the basic position of the central valve, the first valve formed of valve ball 44 and valve seat 35 has a first opening distance A, while the second valve formed of valve seat 7 or the bead 53, respectively, and the closing member 38 has a second opening distance B. The first opening distance A is preferably smaller than the second opening distance B.

The piston 1 of the master brake cylinder operates as follows. FIG. 2 shows a non-actuated condition of the master brake cylinder; the central valve is in its open condition. The piston 1 adopts its basic position, the tappet 19 abuts on the associated transverse pin 59 so that the valve seat 35 designed on the piston 1 is spaced from the valve ball 44. A pressure fluid connection is established between the working chamber 62 and the supply reservoir. Once the brake pedal is depressed, the push rod piston 1 displaces under the effect of the pedal force to the left in the drawing and entrains a non-illustrated secondary piston via the spring 60. The pistons are displaced relative to the housing 68, while the tappet 11, the closing member 38, the actuating pin 43 and the valve ball 44 are not displaced relative to the housing of the master brake cylinder. The springs retain the valve members in their position. As soon as the piston 1 has covered the first opening distance A, the valve seat 35 will move to abut on the valve ball 44 so that the above-mentioned connection between the working chamber 62, on the one side, and the supply reservoir, on the other side, is interrupted. When the piston continues to displace, pressure can now develop in the working chamber 62.

When the piston 1 is moved further to the left, the actuating pin 43 will move away from the valve ball 44, and the valve seat 38 approaches the bead 53. As soon as the piston 1 has covered the second opening distance B, the central valve 6, 38 will close as well. This is effected without pressure, since no pressure is built up in the space between the two individual valves. Thus, the valve seat 7 which consists of rubber or any other suitable sealing material is not damaged.

Provided that the first protection valve 44, 35 closes reliably, the behavior of the central valve 6, 38 is of no consequence.

In a control operation when pressure fluid is supplied by the pump into the working chamber 62, the piston 1 slides back into its basic position. Then, central valve 6, 38 opens first, and next the protection valve 44, 35 opens. Now pressure fluid can flow past the opening protection valve 44, 35 and past the open central valve 6, 38—the opening gap distance is equal to B minus A. Because of the protection valve 44, 35 which is still closed at first, the quantity of pressure fluid discharging through the central valve 6, 38 is limited (or restricted) so that destruction of the rubber seal (valve seat 7) is avoided. The minor pressure reduction occurring in the working chamber 62 results in the working piston 1 being shifted to the left (according to the drawing) again and the protection valve 44, 35 closing. Consequently, a control operation is performed which consists of rapidly successive opening and closing actions of the protection valve 44, 35. Eventually, as much pressure fluid as is supplied by the pump into the master cylinder can discharge through the valve. The master cylinder pressure corresponds to the pedal pressure.

The preceding description is exemplary rather than limiting in nature. The described embodiments could be modified or varied without departing from the purview, scope and spirit of this invention which is limited only by the appended claims.

What is claimed is:

1. A piston with a central valve, a cavity formed in said piston and open at a first piston end, and a central duct formed in said piston between said cavity and a second piston end for use in hydraulic vehicle brake systems, comprising:

a valve disposed within said piston adjacent a first end of said central duct having a rigid supporting insert and an annular elastic valve seat which abuts at least on a peripheral surface of an annular collar of said supporting insert, said collar having two end surfaces enclosed by said valve seat wherein said valve seat includes an annular projection disposed on one end of said valve seat toward said central valve.

2. A piston as claimed in claim 1, wherein said valve case is designed symmetrically relative to a median plane of said collar which extends transversely to the axis of said central duct.

3. A piston as claimed in claim 2, wherein said cavity includes an annular receptacle for receiving an annular projection disposed on one end of said valve seat toward said central duct.

4. A piston as claimed in claim 1, wherein said supporting insert includes an axial bore having two annular recesses.

5. A piston as claimed in claim 1, wherein said annular collar has a rectangular cross-section.

6. A piston as claimed in claim 1, wherein a peripheral surface on said supporting insert tapers conically towards said collar from end surfaces defined on said support insert.

7. A piston as claimed in claim 1, wherein said valve case has an axial bore with a diameter that is larger than the diameter of said central duct.

8. A piston as claimed in claim 1, wherein said supporting insert is made of aluminum, said central valve is made of steel and said piston is made of aluminum.

9. A piston as claimed in claim 1, further comprising a protection device for governing the quantity of pressure fluid flowing through said central valve, said protection device connected upstream of said central valve in the direction from a working chamber at said open piston end to said central duct.

10. A piston as claimed in claim 9, wherein said protection device comprises a restrictor.

11. A piston as claimed in claim 10, wherein said restrictor is a valve.

12. A piston as claimed in claim 9, wherein said controlling device comprises a protection valve connected upstream of said central valve.

13. A piston as claimed in claim 12, wherein said protection valve comprises a valve seat and a valve closure member made of metal, respectively, and wherein said central valve comprises a valve seat and a valve member, said valve seat comprising a seal made of a soft-elastic material.

14. A piston as claimed in claim 13, wherein said valve member of said protection valve comprises a valve ball, and wherein said closing member of said central valve comprises a steel cylinder.

15. A piston as claimed in claim 12, wherein said central valve and said protection valve are designed in said piston, and said valve seats of each said valve are designed in said piston.

16. A piston as claimed in claim 15, wherein said valve seat of said protection valve is provided on an insert member which is rigidly coupled to said piston.

17. A piston as claimed in claim 12, further comprising a transverse pin inserted to extend through a blind-end bore of a master brake cylinder, and an actuating tappet on said pin for actuating said protection valve and said central valve is movable into abutment.

18. A piston as claimed in claim 17, further comprising a closing member on said central valve on said actuating tappet whereat said actuating tappet is adapted to be movable into abutment on said transverse pin.

19. A piston as claimed in claim 18, wherein said closing member is connected to said protection valve by way of an actuating pin for said protection valve.

20. A piston as claimed in claim 12, wherein a basic position of said central valve includes said valve member of said central valve having a first distance from said central valve seat and said valve member of said projection valve has a second distance from said projection valve seat, said first distance being smaller than said second distance.

* * * * *